Figure 5:
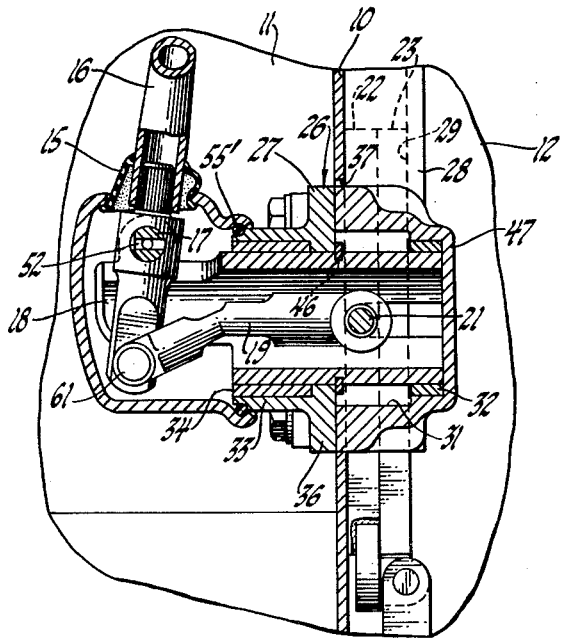

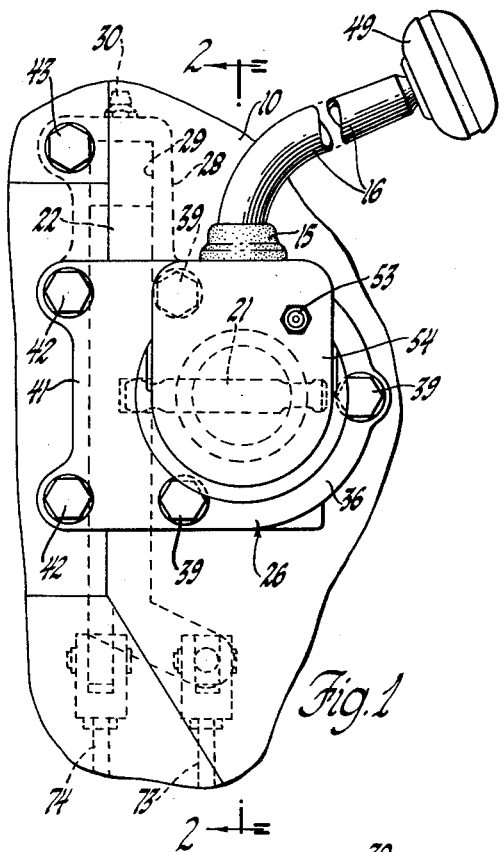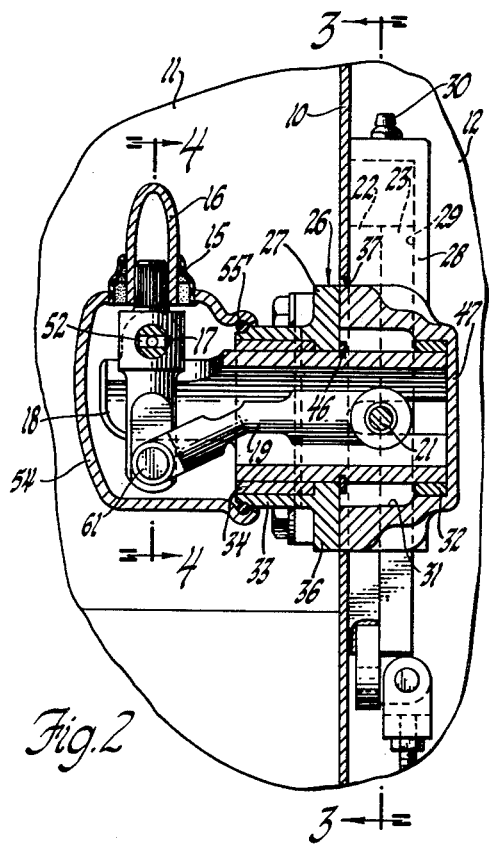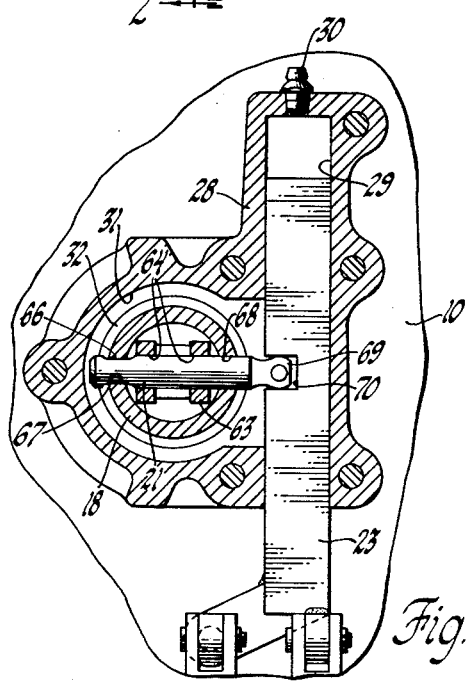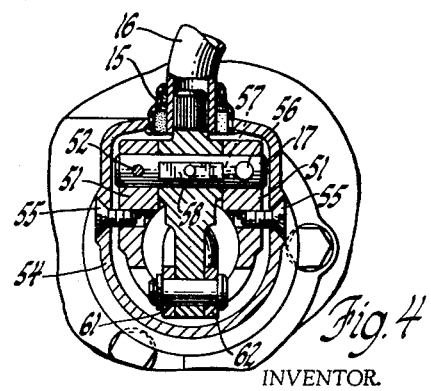
Fig. 1
Fig. 2
Fig. 3
Fig. 4
INVENTOR.
Alfred M. Carlsen, Jr.
BY
ATTORNEY

United States Patent Office 3,138,968
Patented June 30, 1964

3,138,968
TRANSMISSION CONTROL
Alfred M. Carlsen, Jr., Clarkston, Mich., assignor to General Motors Corporation, Detroit, Mich., a corporation of Delaware
Filed Aug. 27, 1962, Ser. No. 219,386
9 Claims. (Cl. 74—473)

This invention relates to a control linkage and more particularly to a transmission control linkage.

In the preferred form of the invention the transmission shift control linkage employs a control tube rotatably mounted on a support. The shift lever which is manually actuated is pivotally mounted on a transverse pivot on one end of the control tube and pivotally connected to one end of a selector rod extending through the center of the tube to the other end of the control tube. A shift pin is secured to the selector rod and slidably mounted in diametrically opposed slots in the control tube. Shift rails, located transversely adjacent to the control tube, each have a recess to receive an actuating end of the shift pin. For selecting movement the hand lever is rocked about a pivot transverse to the axis of the control tube to reciprocate the selector rod located within the control tube to move the shift pin so that the actuator portion enters the recess in the shift rail which the operator wishes to select for shifting. For shifting movement, the hand lever is rotated in either direction about the axis of the control tube to rotate the control tube, the selector rod and shift pin to move the selected shift rail in either direction from the neutral position. This shift lever arrangement provides a rugged simple construction wherein the linkage assembly may be supported on large diameter bearings supporting the control tube.

An object of the invention is to provide in a control linkage a control tube rotatably mounted on a support, a shift lever pivotally mounted by a transverse pivot on the control tube for pivotal movement with respect to the control tube to reciprocate a selector rod extending through the control tube and an actuator and rotary movement with the control tube to rotate the assembly including the actuator for shifting.

Another object of the invention is to provide in a control linkage a control tube rotatably mounted on a support, a shift lever pivotally mounted by a transverse pivot on the control tube and operatively connected to a rod extending through the control tube and the shift lever being rockable to reciprocate the control rod and rotatable to rotate the control tube and control rod.

Another object of the invention is to provide in a transmission control linkage for moving a plurality of controlled members to a shift position on either side of a neutral position, a control tube rotatably mounted in a plurality of spaced bearings in a support, a shift lever pivotally mounted on the control tube for rocking movement in a plane containing the axis of the control tube and for rotating with the control tube about the axis of the control tube and reciprocating in response to rocking movement a selector rod extending through the control tube and controlling the position of the transverse pin extending through a longitudinal slot in said control tube to engage said controlled members and said hand shift lever being rockable to selectively engage said shift pin with one of said controlled members and rotatable to rotate said control tube, control rod and shift pin to move said controlled member from said one to another position.

These and other objects of the invention will be more apparent from the following description of a preferred embodiment of the invention shown in the accompanying drawings.

Figure 6:
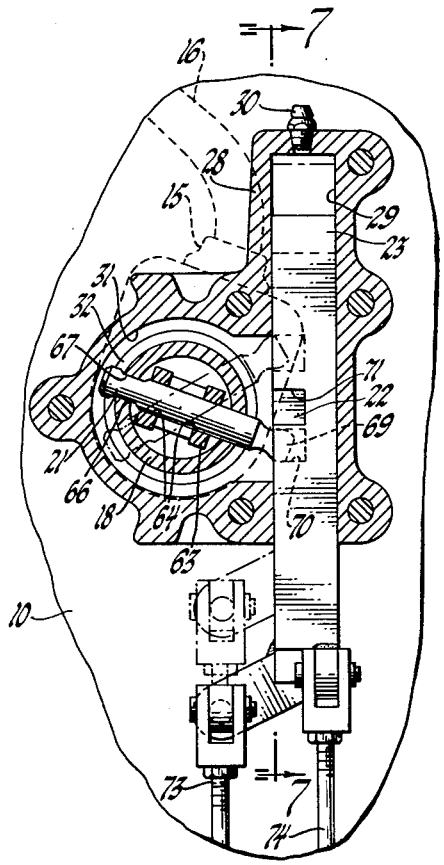
Figure 7:
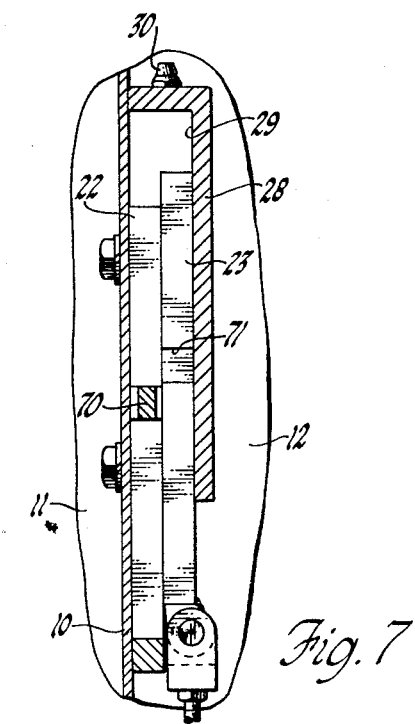

FIGURE 1 is a side elevation view of the transmission control linkage.
FIGURE 2 is a section of FIGURE 1 on the line 2—2.
FIGURE 3 is a section of FIGURE 2 on the line 3—3.
FIGURE 4 is a section of FIGURE 2 on the line 4—4.
FIGURE 5 is a partial section similar to FIGURE 2 with the linkage in a rail selecting position.
FIGURE 6 is a partial section similar to FIGURE 3 illustrating the shift positions.
FIGURE 7 is a section of FIGURE 6 on the line 7—7.

The control linkage is illustrated in the preferred form as a transmission control mounted on a vertical fire wall 10 separating the operator's compartment 11 and an engine transmission compartment 12, as best shown in FIGURE 2. The shift lever 16 is pivotally mounted by a pin 17 mounted on the control tube 18 transversely with respect to the axis of the control tube. The shift lever is pivotally connected to a selector rod 19 secured to the shift pin 21. Rocking movement of the shift lever reciprocates the selector rod and shift pin to select one of the shift rails 22 or 23. When the handle lever is rotated about the axis of the control tube 18, this assembly rotates and the shift pin 21 reciprocates the selected shift rail.

This control linkage is mounted in a support housing 26 having a front cover portion 27 and a rear portion 28. The rear portion 28 of the housing is best shown in FIGURE 3 and has a rectangular chamber 29 having a lubrication fitting 30 to receive and guide the shift rail 22, 23 for reciprocal movement and a circular chamber 31 to house and support the control tube 18. As explained below the wall 10 covers the rectangular chamber. The rear bearing 32 rotatably supports the control tube in the rear portion of the housing. The cover portion of the housing has a cylindrical portion 33 supporting the bearing 34 which rotatably supports the front end of the control tube 18, and a plate portion 36 which is suitably secured to the rear portion 28 and clamps the fire wall 10 between these parts to secure the housing assembly 26 to the fire wall. As illustrated, the fire wall has a circular aperture 37 to receive the circular portion of housing 28 so that the circular portion of cover 27 may be bolted directly to the rear housing by the three bolts 39. The cover 27 also has a side plate portion 41 overlying the fire wall 10 which is secured by bolts 42 to the rear portion of the housing clamping the fire wall therebetween and securing the housing assembly on the fire wall. The bolt 43 also secures the rear housing portion 28 to the fire wall.

The snap ring 46 fits in a groove in the control tube 18 and engages the inside face of cover 27 and together with the rear wall 47 of the housing 28 limits axial movement of the control tube 18.

The shift lever 16 has a handle or knob 49 and is centrally mounted on the pivot pin 17 which is fixed in a pair of ears 51 which are suitably secured to the control tube 18 as by welding or formed integral therewith. The pin 52 prevents rotation of pin 17 in the ears 51. A lubrication fitting 53 passes through a suitable aperture in the rotary housing 54 and is screwed into the portion of bore 56 in the ear 51 (not shown). The bore 56 continues into pin 17 and communicates by a lubrication passage 57 with the lubricating flat 58 on the pin 17 to lubricate the bearing surface between the pin 17 and the shift lever 16. The rotary housing 54 is secured to the control tube by screws 55 and sealed to the cover portion 27 by an O-ring 55′ fitting in opposed annular grooves in the rotary housing 54 and cover portion 27. A flexible boot 15 seals the rotary housing to the shift lever 16.

The lower end of the shift lever 16 is pivotally connected by a pin 61 to the forked end of selector rod 19. The rod 19 also has a fork 63 at the other end with each ear having apertures 64 to receive the shift pin 21. The pin 21 has a portion of reduced diameter 66 fitting in a slot 67 in one side of the control tube 18 to transversely locate the shift pin with respect to the control tube and another portion extending through a diametrically opposite slot 68 and having an actuator portion 69 outside of the control tube. The slots 67 and 68 may extend to the end of the control tube for quick assembly or terminate short of both ends for added strength. The rounded actuator portion 69 of the pin 21 extends into the recesses 70 and 71 in the shift rails 22 and 23 respectively. The shift rails 22, 23 have suitable ears providing a suitable connection to forked control rods 73, 74 respectively.

The transmission control linkage is operated by first rocking the shift lever 16 about an axis transverse to the axis of the control tube 18 provided by the pin 17 to move the selector rod and shift pin 21 from a neutral or central position shown in FIGURE 2 to the position shown in FIGURE 5 moving the actuating portion 69 of the shift pin 21 to enter the recess 70 in the shift rail 22. Then on rotation of the shift lever 16 about the axis of the control tube 18 the assembly consisting of the shift lever, selector rod and control tube will be rotated about the axis of the control tube on the bearings 32 and 34 to rotate the shift pin 21. Rotation in one direction will move the shift rail 22 upwardly while rotation in the other direction will move it down.

The other shift rail may be actuated by rocking the shift lever in the other direction so that the selector rod moves the shift pin 21 into the recess 71 of the other shift rail 23. Then rotation of the shift lever 16 to rotate the control tube 18 and shift pin 21 in one direction will move the shift rail 23 up and rotation in the other direction will move the rail 23 down. This linkage construction provides a sturdy simple construction. The control tube is well supported by large diameter bearings on opposite sides of the load point at pin 21. There is also a minimum of overhang from the bearing 34 to the pivot 17 for the shift lever 16. The rotary moment is transferred from the control tube to the shift pin at the full radius of the control tube and close to the actuating portion. The selector rod is fully supported on the shift lever and the shift pin and does not contact the inside of the control tube modified within the terms of the appended claims.

I claim:

1. In a transmission control linkage; a support; a control tube having a central passage rotatably mounted on said support for rotation about an axis; a shift lever pivotally mounted on a pivot on said control tube on an axis transverse to the axis of said control tube; a selector rod pivotally connected to said shift lever and extending into the central passage of said control tube; a shift pin secured for axial movement to said selector rod and having an actuating portion extending outside of said control tube; said shift pin and control tube having means mounting said shift pin on said control tube for axial movement relative to said control tube and rotary movement with said control tube; a plurality of controlled members located adjacent said control tube and each having operating means for cooperating with said actuating portion to move each controlled member in response to movement of said actuating portion; said shift lever on pivotal movement about said pivot axially moving said shift pin to selectively engage said actuating portion with said operating means of the selected controlled member and said shift lever being rotatable about the axis of the control tube to rotate the control tube and shift pin to move the selected controlled member.

2. The invention defined in claim 1, said support including a housing substantially enclosing said control tube and having spaced bearings rotatably supporting said control tube on opposite sides of said shift pin, and means mounted on said control tube completing the enclosure of said control tube and biasing sealed to said housing.

3. The invention defined in claim 1 and means cooperating between said shift pin and said control tube to prevent lateral movement of said shift pin relative to said control tube.

4. The invention defined in claim 1, said support having bearing means on opposite sides of said shift pin to rotatably support said control tube and means to axially locate said control tube with respect to said support.

5. In a transmission control linkage; a support; a control tube having a central passage rotatably mounted on a pivot on said support for rotation about an axis; a shift lever pivotally mounted on said control tube on an axis transverse to the axis of said control tube; a selector rod pivotally connected to said shift lever and extending into the central passage of said control tube; a shift pin slidably mounted on said control tube, secured for axial movement to said selector rod and having an actuating portion extending outside of said control tube; a plurality of controlled members located adjacent said control tube and having means cooperating with said actuating portion; said shift lever on pivotal movement about said pivot axially moving said shift pin to selectively engage said actuating portion with one or the other controlled members and said shift lever being rotatable about the axis of the control tube to rotate the control tube and shift pin to move the selected controlled member.

6. In a transmission control linkage; a support; a control tube having a central passage rotatably mounted on a pivot on said support for rotation about an axis; a shift lever pivotally mounted on said control tube on an axis transverse to the axis of said control tube; a selector rod pivotally connected to said shift lever and extending into the central passage of said control tube; said control tube having a pair of diametrically opposed axially extending slots located between said bearings; a shift pin slidably mounted in said slots, secured for axial movement to said selector rod and having an actuating portion extending outside of said control tube; a pair of shift rails located adjacent said control tube and having recesses positioned to receive said actuating portion; said shift lever on pivotal movement about said pivot axially moving said shift pin in said slot to selectively engage said actuating portion in the recess in one or the other shift rail and said shift lever being rotatable about the axis of the control tube to rotate the control tube and shift pin to move the selected shift rail.

7. In a transmission control linkage; a support having a pair of spaced bearings; a control tube having a central passage rotatably mounted in said spaced bearings for rotation about an axis; a shift lever pivotally mounted on a pivot on said control tube on an axis transverse to the axis of said control tube at a point outward of one of said bearings; a selecter rod pivotally connected to said shift lever and extending into the central passage of said control tube; said control tube having a pair of diametrically opposed axially extending slots located between said bearings; a shift pin slidably mounted in said slots, secured for axial movement to said selector rod and having an actuating portion extending outside of said control tube; a pair of shift rails located adjacent said control tube and having recesses positioned to receive said actuating portion; said shift lever on pivotal movement about said pivot axially moving said shift pin in said slot to selectively engage said actuating portion in the recess in one or the other shift rail and said shift lever being rotatable about the axis of the control tube to rotate the control tube and shift pin to move the selected shift rail.

8. The invention defined in claim 7 and said shift rails being located for axial sliding movement transversely to said control tube between said spaced bearings.

9. The invention defined in claim 7 and said shift pin and control tube having means to limit transverse movement of said shift pin with respect to said control tube.

No references cited.